United States Patent [19]

Nakamura et al.

[11] Patent Number: 5,382,933
[45] Date of Patent: Jan. 17, 1995

[54] SOLENOID VALVE DEVICE

[75] Inventors: Hirotaka Nakamura; Astushi Nishijoh, both of Tokyo; Shigeki Tsuchiya, Kasukabe; Yoshiaki Hirobe, Minamisaitama, all of Japan

[73] Assignee: Akebono Brake Industry Co., Ltd., Tokyo, Japan

[21] Appl. No.: 966,089

[22] Filed: Oct. 23, 1992

[30] Foreign Application Priority Data

Oct. 25, 1991 [JP] Japan .................. 3-087851[U]

[51] Int. Cl.[6] .................................. H01F 7/00
[52] U.S. Cl. ........................... 335/278; 335/260; 336/96
[58] Field of Search ............... 335/151, 260, 278, 292, 335/303; 336/90, 94, 96; 174/52.2; 264/272.11–272.20

[56] References Cited

U.S. PATENT DOCUMENTS

| | | | |
|---|---|---|---|
| 2,743,308 | 4/1956 | Bardsley | 336/96 |
| 4,019,167 | 4/1977 | Barker | 336/96 |
| 5,138,292 | 8/1992 | Forster | 335/278 |
| 5,142,103 | 8/1992 | Stine | 174/52.2 |
| 5,155,660 | 10/1992 | Yamada et al. | 361/386 |
| 5,249,101 | 9/1993 | Frey et al. | 361/717 |

FOREIGN PATENT DOCUMENTS 167061 7/1991 Japan .

*Primary Examiner*—Leo P. Picard
*Assistant Examiner*—Ramon M. Barrera
*Attorney, Agent, or Firm*—Knobbe, Martens, Olson & Bear

[57] ABSTRACT

Disclosed is a solenoid valve device having a bobbin assembly 3 including an outer yoke 105 as a magnetic circuit, a solenoid coil 20 positioned within the outer yoke 105, and a connector pin 107 for supplying the electric current to the solenoid coil 20. The bobbin assembly 3, which is molded of at least two layers of resins, has an inner resin section 120 for integrally setting at least the outer yoke 105 and the solenoid coil 20 together, and an outer resin section 125 to enclose the inner resin section 120, forming the outer surface of the bobbin assembly 3. This inner resin section 120 is formed of a resin having a higher coefficient of thermal expansion than the outer resin section 125, while the outer resin section 125 is formed of a resin having a higher dimensional stability than the inner resin section 120.

15 Claims, 5 Drawing Sheets

SOLENOID VALVE DEVICE

BACKGROUND OF THE INVENTION

1. Field of the Invention

The present invention relates to a brake control mechanism mounted on a motor vehicle, and particularly for a solenoid valve device used for an air over hydraulic braking system. 2. Description of the Related Art The air over hydraulic braking system has a brake control mechanism using an air modulator. This brake control mechanism has a solenoid valve device for brake control. The solenoid valve device has a bobbin assembly. This bobbin assembly includes an outer yoke constituting a magnetic circuit, a solenoid coil located in this outer yoke, and a connector pin for supplying the electric current to the solenoid coil. These parts of the bobbin assembly thus formed is provided with air-tightness and insulating properties.

It is expected that integrally molding the built-in parts of a thermosetting epoxy resin will improve dimensional stability and water resistance.

Incidentally, in the case where these parts produced of epoxy resin by molding, the resin differs in linear expansion coefficient from built-in metallic parts. Therefore, the bobbin assembly, receiving heat generated by the operation of the solenoid valve and outside air temperature, is subjected to a temperature change, resulting in a difference between the expansion of the built-in parts and that of the resin parts, and consequently in a damage such as a crack in the resin parts.

Molding the bobbin assembly of a high rate of elongation resin is considered for the purpose of preventing the cracking of the resin likely to be caused by a temperature change. The use of the resin of high rate of elongation can prevent cracking, but still there is a fear that resin expansion and contraction will easily occur with the temperature change, resulting in deteriorated air-tightness and water resistance of the bobbin assembly.

SUMMARY OF THE INVENTION

In view of the above-described various disadvantages inherent in the heretofore known related arts, it is an object of the present invention to provide a solenoid valve device, suiting a brake control mechanism in particular, having heat resistance, weather resistance and water resistance.

The solenoid valve device of the brake control mechanism of the present invention is provided with a bobbin assembly 3. This bobbin assembly 3 includes an outer yoke 105 as a magnetic circuit, a solenoid coil 20 located within this outer yoke 105, and a connector pin 107 for supplying the electric current to the solenoid coil 20. These components are molded of at least double layers of resins of different properties.

The molding of at least double layers of resins of different properties is meant for example by molding the inside layer of the bobbin assembly 3 of a resin of high coefficient of thermal expansion and the outside layer of the bobbin assembly 3 of a resin having excellent properties such as high dimensional stability and water resistance, integrally enclosing the inside layer. Furthermore, the bobbin assembly 3 may be molded of three layers of resins of different properties.

The brake control mechanism is provided with a modulator 21 for regulating a hydraulic pressure of wheel cylinders 130 of the vehicle.

The modulator 21 has an air over hydraulic cylinder for changing the air pressure to a fluid pressure. This air over hydraulic cylinder includes a built-in air piston 2 on one side which is pneumatically actuated, and a built-in hydraulic piston on the other side which is hydraulically operated.

The modulator 21 of a known type is fitted with a unitized one (a valve unit 6) of a solenoid valve (a hold valve 4 and a decay valve 5) for controlling the suction of air into the air chamber of the modulator 21, and the holding of the air in the air chamber and the discharge of the air from the air chamber. It is also considered to provide this type of valve unit 6 with a traction control mechanism.

That is, in the valve unit 6 are parallelly disposed the hold valve 4 as a first valve device and the decay valve 5 as a second valve device. A valve block 7 constituting the valve section of these valves and a solenoid block 8 generating the electromagnetic force are integrally secured by means of a through bolt 19.

Here, the solenoid block 8 is provided with the bobbin assembly 3 of the present invention.

The bobbin assembly 3 includes a first solenoid coil 20a on the hold valve 4 side, a second solenoid coil 20b on the decay valve 5 side. The first solenoid coil 20a and the second solenoid coil 20b, both wound on bobbins respectively, are disposed inside of the outer yoke 105. The first solenoid coil 20a, the second solenoid coil 20b, and connector pins 107a, 107b and 107c through which the current is supplied to these solenoid coils are integrally formed by resin molding.

The first solenoid coil 20a side has a hold plunger 23 which controls the hold valve 4. Also, the second solenoid coil 20b side has a decay plunger 60 which controls the decay valve 50.

During brake controls such as traction control and antilock control, the electric current is supplied to the first solenoid coil 20a and the second solenoid coil 20b located in the outer yoke 105 through the connector pin 107 of the bobbin assembly 3 installed in the valve unit 6 of the modulator 21 in accordance with an instruction from a control unit.

The magnetomotive force of this first solenoid coil 20a operates the hold plunger 23, which in turn opens and closes the hold valve 4. Also the magnetomotive force of the second solenoid coil 20b actuates the decay plunger 60, opening and closing the decay valve 5.

In the event of a temperature change of the bobbin assembly 3 resulting From the heat produced by the above-described solenoid valve operation or a change in the outside air temperature, the outer yoke 105 and the connector pin 107 which are metallic parts built inside are subject to expansion or contraction. At this time, the resin-molded section of high coefficient of thermal expansion of the bobbin assembly 3 expands or contracts with the expansion or contraction of these built-in parts, thereby keeping the airtightness of the bobbin assembly 3.

The resin-molded section having high dimensional stability are not affected by a temperature change because the expansion or contraction of the built-in parts is absorbed by the resin-molded section of high coefficient of thermal expansion. The bobbin assembly 3, therefore, maintains high dimensional stability and water resistance.

The solenoid valve device of the present invention maintains good airtightness and electrical insulating properties, and high dimensional stability and water resistance.

The foregoing object and other objects of the solenoid valve device according to the present invention will become more apparent and understandable from the following detailed description thereof, when read in connection with the accompanying drawings.

DESCRIPTION OF THE PREFERRED EMBODIMENT

Figure 1:
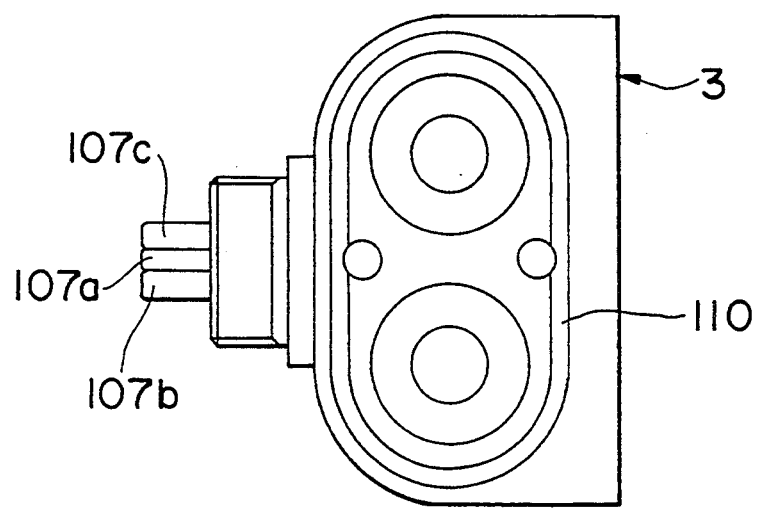
FIG. 1 is a top view of a bobbin assembly of one embodiment of a solenoid valve device according to the present invention.

Hereinafter one embodiment of a solenoid valve device according to the present invention will be explained by referring to FIGS. 1 to 7.

The modulator 21 of the brake control mechanism is provided with a modulator unit 44 in one end for changing a pneumatic pressure to a hydraulic pressure and the valve unit 6 having a solenoid valve on the other end. The modulator unit 44 has an air cylinder 45 with a piston installed inside which is pneumatically actuated in the direction of the valve unit 6. Furthermore, the modulator unit 44 is provided with a hydraulic housing 46 having a piston which is operated with the hydraulic pressure in the opposite direction of the valve unit 6.

In the air cylinder 45 are installed the air piston 2 which is movable in the axial direction of the air cylinder 45, and a piston rod 47 which is movable in connection with this air piston 2.

On the base end face of the hydraulic housing 46 is attached one end of a piston return spring 48 which is an elastic member.

The air piston 2, in a common state, is being pressed toward the valve unit 6 side by means of the piston return spring 48. Between the air piston 2 and the valve unit 6 there is defined an air chamber 1 which expands in accordance with the quantity of air supplied from the valve unit 6. The air piston 2 functions to compress this air chamber 1. An air cup 50 is fitted on the peripheral surface of the air piston 2 to prevent air leakage from the air chamber 1 to the piston return spring 48 side.

The hydraulic housing 46 has a hydraulic cylinder 52 which is smaller in diameter than the air cylinder 45. And in this hydraulic cylinder 46 is movably inserted the hydraulic piston 52 which is operated with the hydraulic pressure. The hydraulic piston 52 is connected with the end of the piston rod 47.

On the forward end side of this hydraulic cylinder 52, a hydraulic outlet 53 communicating with the wheel cylinder 130 is open.

In the side section of the hydraulic housing 46 is provided a hydraulic inlet 54 communicating with an external reservoir which is not illustrated, so that brake fluid will be supplied from the reservoir (not illustrated) to the hydraulic cylinder 52 through the hydraulic inlet 54.

A check valve is fitted in the hydraulic inlet 54 to give a fixed residual pressure to the wheel cylinder 130.

Next, the construction of the valve unit 6 will be explained.

Figure 4:
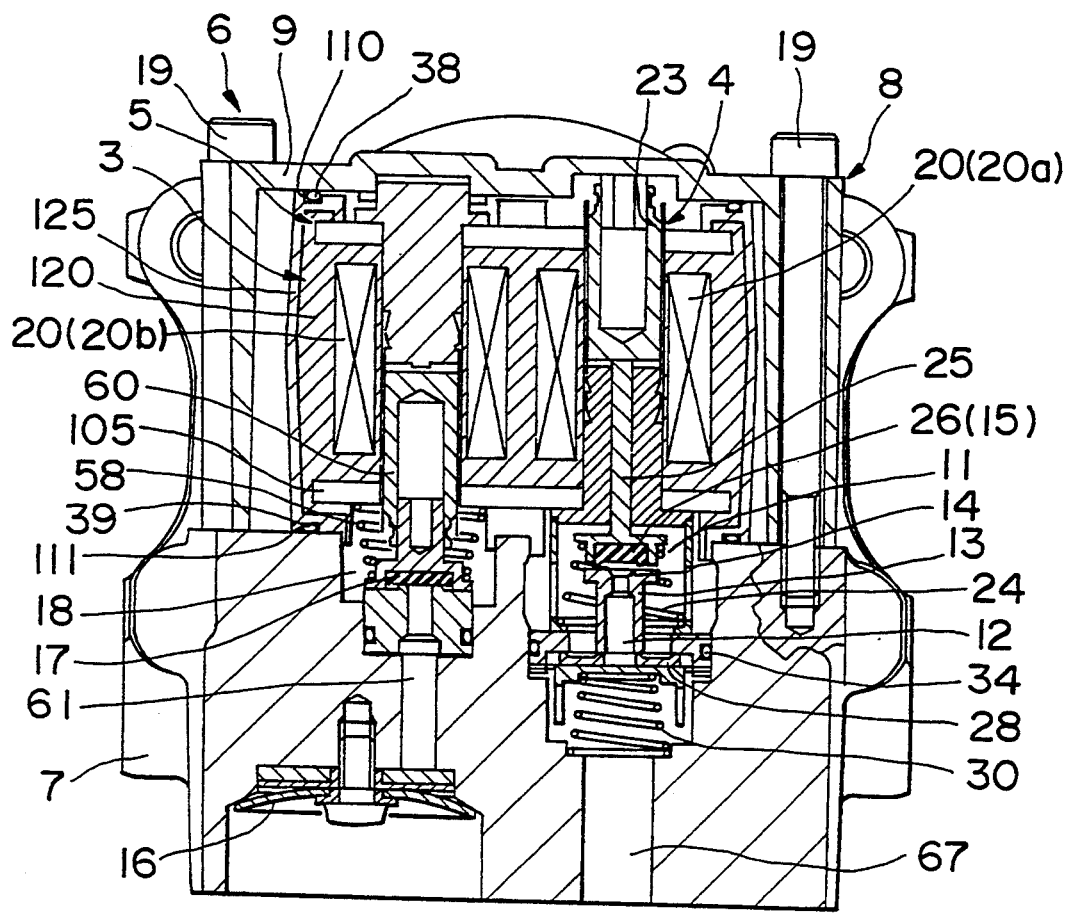
FIG. 4 is a side sectional view of the internal structure of a valve unit of the present embodiment taken along line IIa—IIa of FIG. 6.
Figure 5:
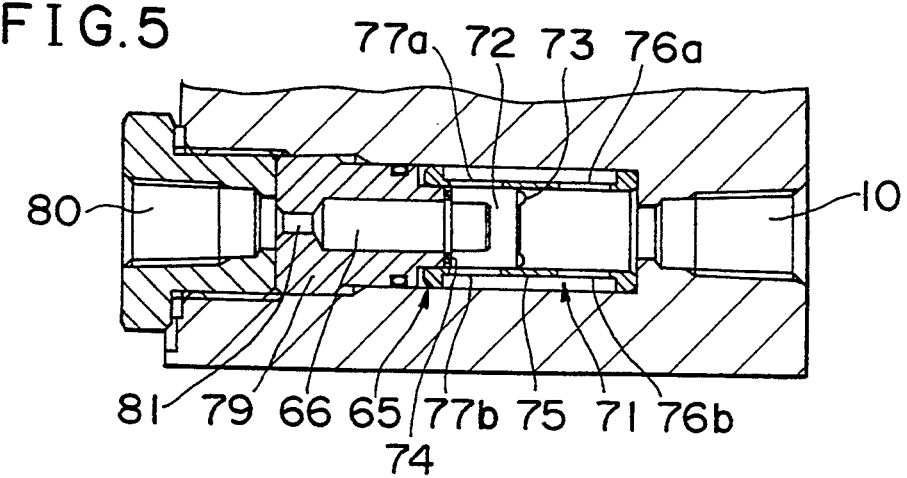
FIG. 5 is a side sectional view of the valve unit in the present embodiment taken along line IIb—IIb of FIG. 6.

In FIGS. 4 and 5, the valve unit 6 of the present embodiment is of such a construction that the hold valve 4 is located on the right side while the decay valve 5, on the left side. The solenoid block 8 is located in the upper part of the valve unit 6, and the valve block 7 is located in the lower part of the valve unit 6. The solenoid block 8 and the valve block 7 are of a splittable construction. The solenoid block 8 is secured to the valve block 7 by means of a through bolt 19.

The solenoid block 8 is provided with the bobbin assembly 3 covered with a cover 9. The bobbin assembly 3 has the first solenoid coil 20a on the hold valve 4 side and the second solenoid coil 20b on the decay valve 5 side. The first solenoid coil 20a and the second solenoid coil 20b, both wound on their bobbins respectively, are positioned inside the outer yoke 105 which serves as a magnetic circuit. The first solenoid coil 20a, the second solenoid coil 20b, the outer yoke 105, and the connector pins 107a, 107b and 107c through which the current is supplied to these solenoid coils are integrally formed by resin molding.

Figure 2:
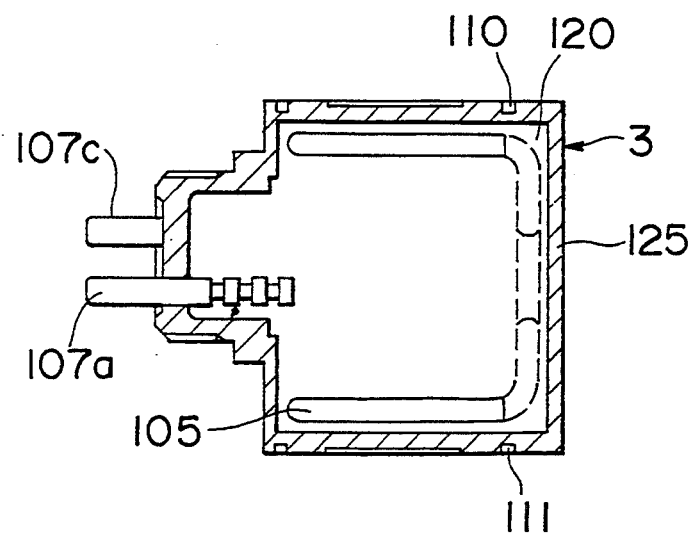
FIG. 2 is a longitudinal half-cutaway sectional view of the bobbin assembly of the present invention.

The bobbin assembly 3, as shown in FIG. 2, has double resin sections of different properties.

That is, the aforesaid built-in parts of the bobbin assembly 3 are integrally set with a resin of high coefficient of thermal expansion, forming an inner resin section 120. This inner resin section 120 is then covered with a resin of good dimensional stability and water resistance, thus forming an outer resin section 125.

It is desirable that the inner resin section 120 be formed of at least one resin selected From among for example polyphenylene oxide (PPO), ABS, polycarbonate, polyamide, polyacetal, polysulfone, and polyphenylene sulfide.

It is also desirable that the outer resin section 125 be formed of at least one resin selected from among thermosetting epoxy resin, unsaturated polyester resin, phenolic resin, polybutylene terephthalate, and modified polyphenylene ether.

Figure 3:
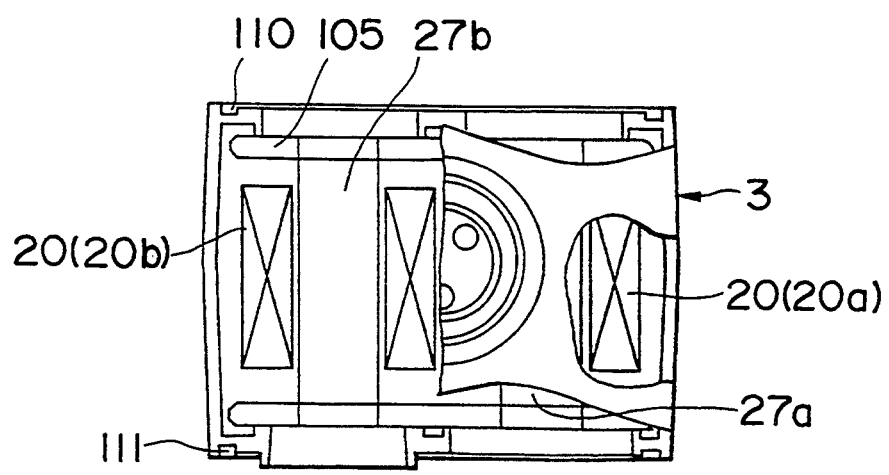
FIG. 3 is a partial sectional view of the bobbin assembly of the present embodiment as viewed from the connector pin side.
Figure 2A:
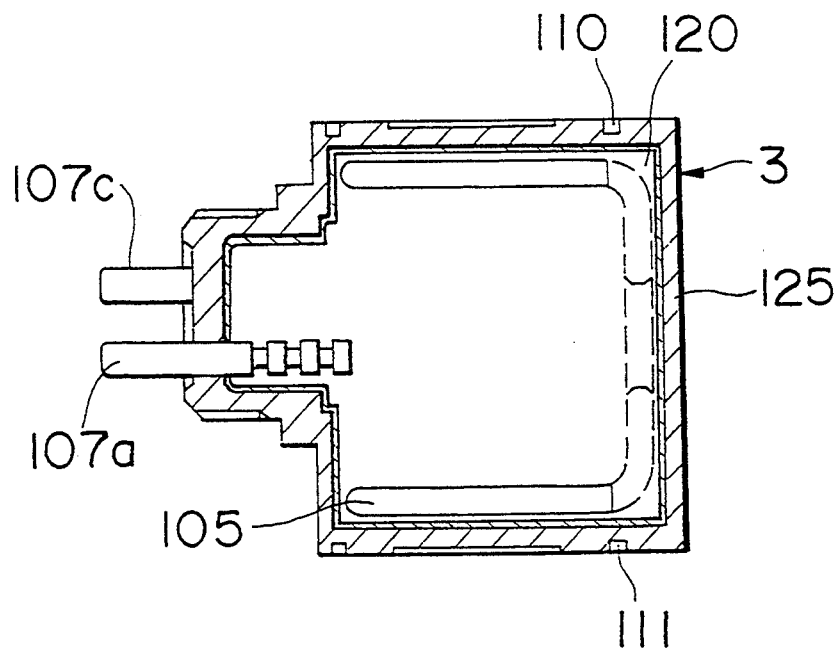
FIG. 2a is a longitudinal half-cutaway sectional view of the bobbin assembly showing an intermediate resin section.
Figure 3A:
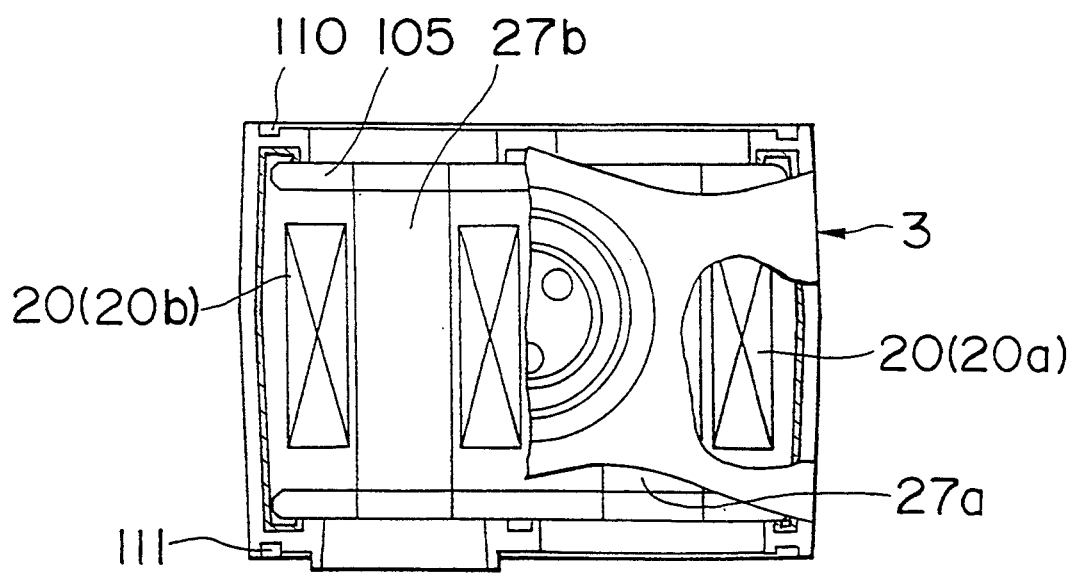
FIG. 3a is a partial sectional view of the bobbin assembly as viewed from the connector pin side showing an intermediate resin section.

In FIGS. 1 to 3, formed in the upper surface of the bobbin assembly 3 is a first seal groove 110 surrounding the first solenoid coil 20a and the second solenoid coil 20b. Also in the lower surface of the bobbin assembly 3 is formed a second seal groove 111 surrounding the first solenoid coil 20a and the second solenoid coil 20b. In the first seal groove 110, a first O-ring 38 is fitted. Further in the second seal groove 111 is fitted a second O-ring 39, thereby fully sealing the cover 9 and the valve block 7.

A first hollow part 27a is located inside of the first solenoid coil 20a. Furthermore, a second hollow part 27b is formed inside of the second solenoid coil 20b. That is to say, these hollow parts are passing through the bobbin assembly 3.

In the hollow part of the solenoid coil 20a is inserted the hold plunger 23 which is movable in the axial direction. The lower end of this hold plunger 23 is in contact with the upper end of a valve pin 25 being pressed upwards in the drawing with the spring force of a hold spring 24. Below the bobbin assembly 3 in the hold valve 4 side is provided a hold valve chamber 11 constituting a housing of valve members. This valve pin 25 has an expanded diameter in the hold valve chamber 11, and a valve rubber 26 is fitted on the bottom end face of the valve pin 25, forming a hold valve body 15.

Below the valve pin 25 in the hold valve chamber 11, a valve receiving member 13 as a valve seat of the valve pin 25 is disposed. Within this valve receiving member 13 is formed an air inlet passage 12 in the axial direction with its one end connected with a communicating passage 67. The other end of this air inlet passage 12 forms an opening 14 at the upper end face of the valve receiving member 13. On the peripheral side surface of this valve receiving member 13 is fitted an O-ring 34. The O-ring 34 functions to prevent air leakage from the communicating passage 67 to the hold valve chamber 11 side when the valve is in a closed position.

The valve receiving member 13 has, on its lower surface, a return valve 28 which allows only the flow of air towards the communicating passage 67 from the hold valve chamber 11. This return valve 28 is mounted, being pressed upwards by the return spring 30.

Figure 6:
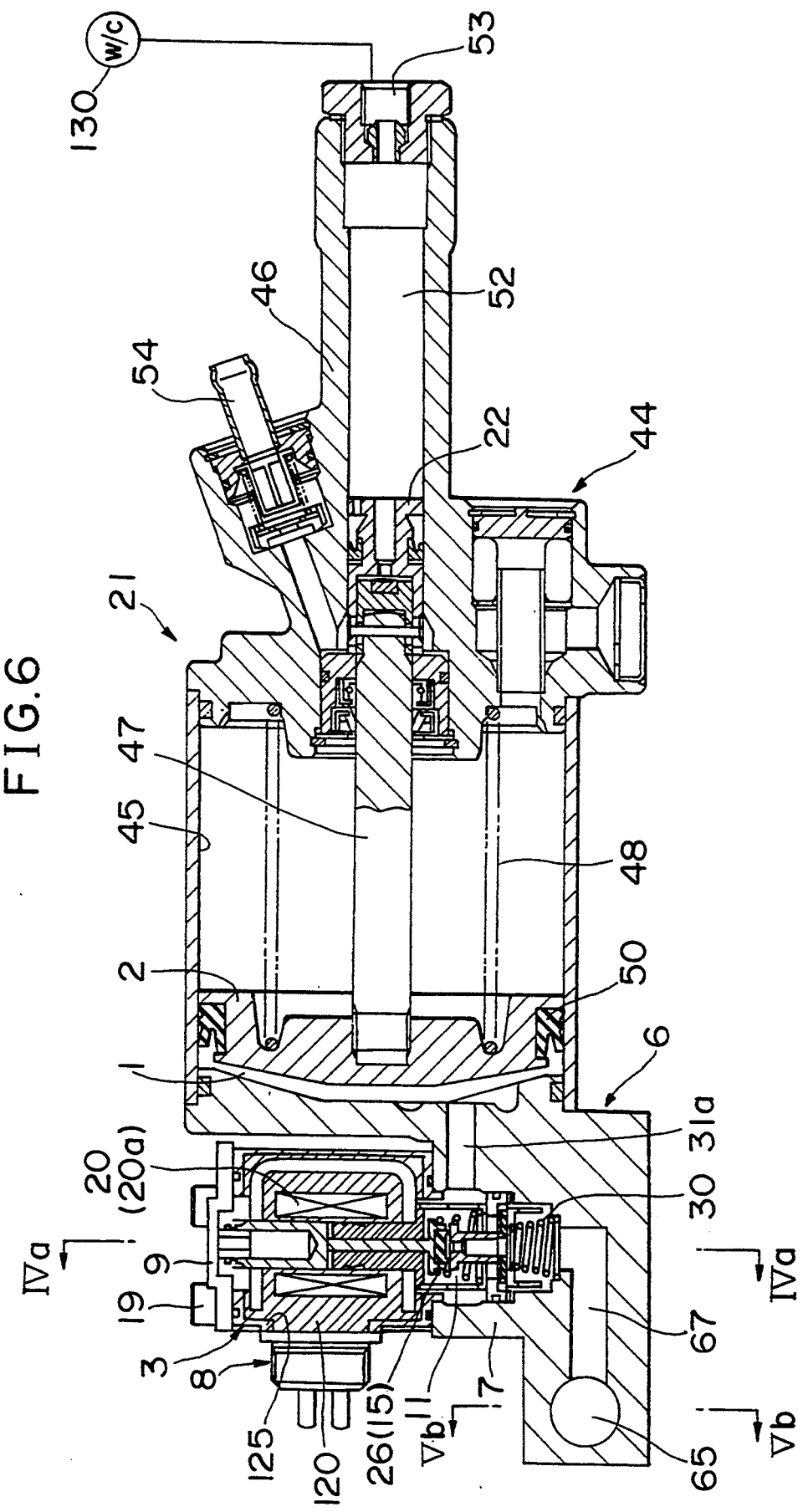
FIG. 6 is a front sectional view of the hold valve side showing the general constitution of a modulator in the present embodiment.

The hold valve body 15 of the hold valve 4 is pressed upwards by means of the hold spring 24 when no electric current is being supplied to the first solenoid coil 20a. That is, the hold valve body 15 is apart from the opening 14, constituting a constantly-open control valve. The hold valve chamber 11, as shown in FIG. 6, communicates with a chamber passage 31a communicating with the air chamber 1.

On the decay valve side is installed the decay plunger 60 being pressed downwards by the decay spring 58. The lower end of this decay plunger 60 has an expanded section within a decay valve chamber 18. On the forward end face of this expanded section is fitted a valve rubber, forming a decay valve body 17.

The decay valve body 17 is in contact with an exhaust passage 61 communicating with an exhaust valve 16 when no electric current is being supplied to the second solenoid coil 20b. That is, the decay valve body 17 constitutes a constantly-closed control valve.

Figure 7:
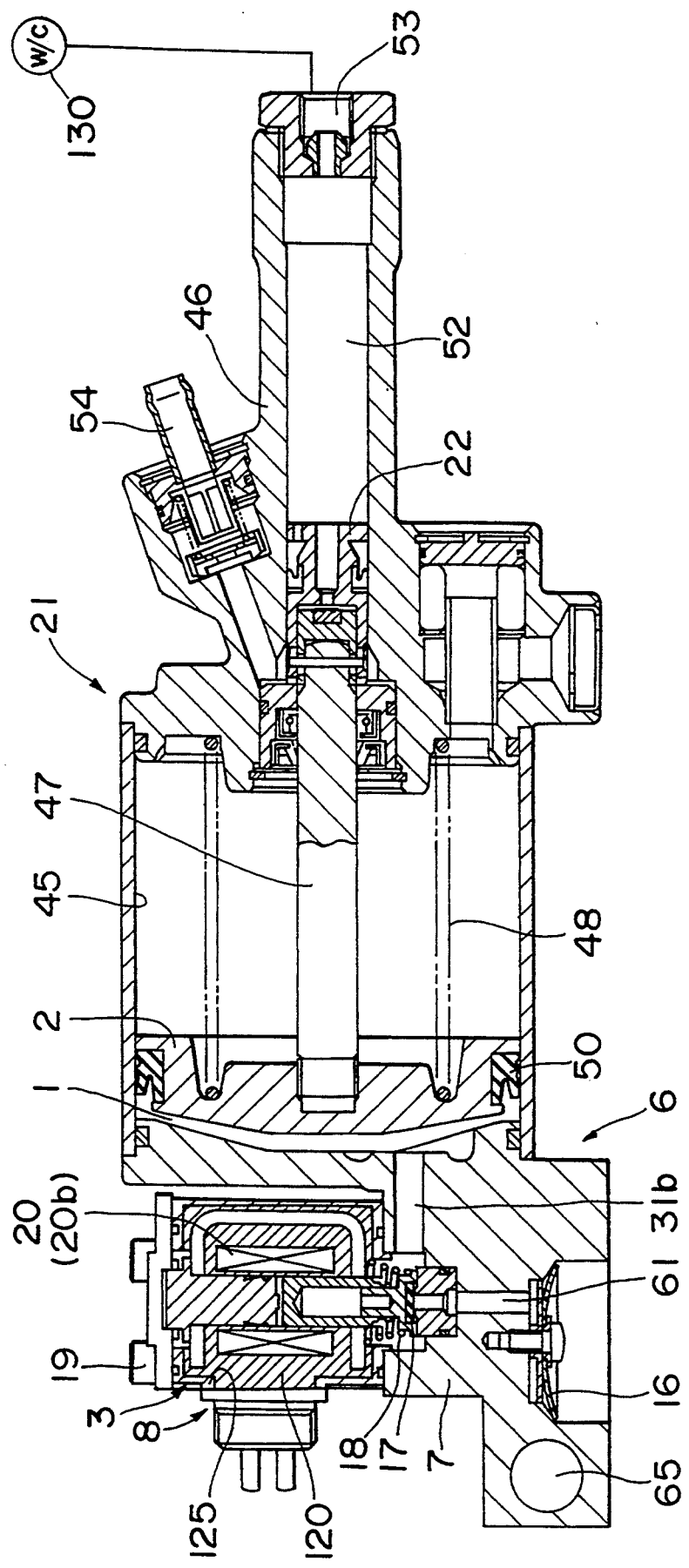
FIG. 7 is a front sectional view of the decay valve side showing the general constitution of the modulator in the present embodiment.

The decay valve chamber 18, as shown in FIG. 7, is connected with a chamber passage 31b communicating with the air chamber 1. Here, as previously stated, the decay valve body 17 in an ordinary state is in a closed position, and therefore the air in the air chamber 1 will not flow to the decay valve 5 side.

In the lower part of the valve block 7, a connecting passage 65 is provided in a lateral direction in FIG. 5. This connecting passage 65 is connected at the right end to a first air inlet 10 which communicates with the brake valve side not illustrated. Also the left end of the connecting passage 65 is connected with a second air inlet 80 communicating with a traction control valve side not illustrated. Further, the connecting passage 65 connected with the communicating passage 67 connected to the hold valve 4 side. That is, the connecting passage 65 is connected in three directions with the first air inlet 10, the second air inlet 80 and the communicating passage 67.

Installed inside this connecting passage 65 on the first air inlet 10 side, is a shuttle valve device 71 for controlling the flow of an air. On the second air inlet 80 side also, a throttle valve 81 is provided to control the flow of an air. The shuttle valve device 71 side and the throttle valve 81 side are connected by an air passage 66.

A cylindrical collar 75 is fitted in the shuttle valve device 71. This collar 75 is made larger in diameter than the first air inlet 10 and the air passage 66 and smaller in diameter than the connecting passage 65.

On and under the one end section of the collar 75 on the first air inlet 10 side are formed slits 76a and 76b through which the air passes. Also on and under the other end section of the collar 75 on the air passage 66 side are similarly formed slits 77a and 77b. The slits for air passage may be formed large in diameter or many slits may be provided with the strength of the collar 75 taken into consideration.

A shuttle valve piston 72 which is a valve body of nearly the same diameter as the inner diameter of the collar 75 is slidably fitted in the collar 75. On the end face on the first air inlet 10 side of this shuttle valve piston 72 is installed a first valve rubber 73. On the end face on the throttle valve 81 side of the shuttle valve piston 72 is installed a ring-like second valve rubber 74. When this shuttle valve piston 72 has come to the rightmost end position in the collar 75 in FIG. 5, the first valve rubber 73 tightly closes the connecting passage 65 and the first air inlet 10. Also, when the shuttle valve piston 72 has come to the leftmost end position in the collar 75, the second valve rubber 74 tightly closes the shuttle valve device 71 side and the throttle valve 81 side in the connecting passage 65.

On the throttle valve 81 side in the connecting passage 65, a casing 79 is fitted inside with its one end in contact with the collar 75 and with its other end in contact with the second air inlet 80. One end section of this casing 79 is formed as the air passage 66, while the other end section is formed as the throttle valve 81.

Next, the operation of the present embodiment will be explained.

First, when brakes are applied, one end of the shuttle valve piston 72 is pushed with air supplied from the first air inlet 10 to the connecting passage 65. The shuttle valve piston 72 comes in contact with one end of the air passage 66, tightly closing the air passage between the shuttle valve device 71 side and the throttle valve 81 side. The air is supplied to the air chamber 1 through the slits 76a and 76b of the collar 75 and the hold valve 4 side. The air piston 2 is moved in the direction of the hydraulic housing 46. Consequently, the hydraulic piston 22 is operated, the brake fluid in the hydraulic cylinder 52 is compressed toward the wheel cylinder 130, thus applying the brakes.

At this time, when a centralized control unit detects the possibility of a wheel lock from a signal supplied from a speed sensor which is not illustrated, the electric current is supplied at a specific voltage to the solenoid coil 20a on the hold valve 4 side in the valve unit 6 via a connector pin 107b. As a result, the hold valve body 15 closes to stop supplying the air to the air chamber 1. At the same time, the current is supplied also to the solenoid coil 20b on the decay valve 5 side via a connector pin 107c, thus opening the decay valve body 17.

The air in the air chamber 1, therefore, is exhausted through the route of the chamber passage 31b→the decay valve chamber 18→the exhaust passage 61→the exhaust valve 16. Then, the air piston 2 in the modulator 21 is moved in the direction in which the air chamber 1 is compressed, with the force of the piston return spring 48 and the fluid pressure acting on a hydraulic piston 22. Since the hydraulic piston 22 is operated, the brake fluid in the wheel cylinder 130 is drawn toward the modulator 21, being reduced in pressure to prevent the wheel lock.

To hold the fluid pressure in the wheel cylinder 130, both the hold valve body 15 and the decay valve body 17 are closed to trap the air within the air chamber 1.

Furthermore, for applying the pressure to the wheel cylinder 130 again, the hold valve body 15 is opened while the decay valve body 17 is left closed. Consequently, the air from the first air inlet 10 is supplied again from the hold valve 4 side to the air chamber 1.

Next, the operation of the solenoid valve device during traction brake application will be explained.

When the centralized control unit has judged the occurrence of a slip of one driving wheel or both when accelerating, the air from a traction control valve not illustrated flows into the connecting passage 65 from the second air inlet 80.

The air that has flowed into the connecting passage 65 flows in the throttle valve 81, flowing from the air passage 66 to the shuttle valve device 71 side, pressing the other end of the shuttle valve piston 72 into contact with the first air inlet 10 to close the connecting passage 65 tight against the first air inlet 10. Then, the air is supplied from the chamber passage 31a to the air chamber 1 through the slits 77a and 77b of the collar 75, the communicating passage 67 and the hold valve 4 side, thereby performing brake control.

That is, the air from the air tank flows into the connecting passage 65 through the traction control valve and the second air inlet 80, and supplied to the air chamber 1 through the route of the throttle valve 81→the air passage 66→the collar 75→the slits 77a and 77b →the hold valve 4 side→the chamber passage 31a.

At this time, the electric current of specific voltage is applied to the first solenoid coil 20a and the second solenoid coil 20b through the connector pin 107 in accordance with the slipping condition of each wheel. And the hold valve 4 and the decay valve 5 are operated, according to the slipping condition, to adjust the traction brake control.

Next, the operation of the solenoid valve device with the brake control released in ordinary brake operation will be explained.

The air in the air chamber flows from the hold valve 4 side into the connecting passage 65, from which the air then passes from the slits 76a and 76b of the collar 75 through inside the collar 75, being exhausted at the brake valve through the first air inlet 10.

At this time, a negative pressure is built up by the velocity of the air in the inside space of the collar 75 in relation to the air passage 66. The shuttle valve piston 72 moves to the first air inlet 10 side. Consequently, in the connecting passage 65, connecting the shuttle valve device 71 side with the throttle valve 81 side. As a result, the air from the hold valve 4 side flows into the collar 75 from the slits 77a and 77b of the collar 75. Subsequently, this air is exhausted from the air passage 66 which has been opened.

That is, the air in the air chamber 1 flows to the connecting passage 65 through the chamber passage 31a →the hold valve chamber 11→the communicating passage 67, and further is divided into two directions at the connecting passage 65, being discharged. The air in one direction flows into the collar 75 on one end side of the shuttle valve piston 72 through the slits 76a and 76b and is discharged through the first air inlet 10 and the brake valve. In the meantime the air in the other direction flows into the collar 75 on the other end side of the shuttle valve piston 72 through the slits 77a and 77b, passes inside the air passage 66 and the throttle valve 81, and is discharged at the exhaust valve of the traction control valve through the second air inlet 80.

In the above-described operation, the temperature of the bobbin assembly 3 changes with heat generated by solenoid valve operation or with a change in the outside air temperature. At this time, built-in metallic parts, such as the outer yoke 105 and the connector pin 107, are subjected to expansion or contraction, which is accompanied by the expansion and contraction of the resin-molded section 120 in the bobbin assembly 3, thereby maintaining the airtightness of the bobbin assembly 3.

In this case, the outer resin-molded section 125 absorbs the expansion or contraction of the built-in parts of the inner resin-molded section 120, and therefore will not be affected by the built-in parts which are subjected to a temperature change, thence maintaining high dimensional stability and water resistance which are the characteristics of the resin-molded section 125.

Since the outer resin-molded section 125 maintains the dimensional stability and water resistance as stated above, there will never occur a slightest positional change of the first seal groove 110 and the second seal groove 111. The valve unit 6, therefore, keeps high airtightness to the outside air.

During the aforementioned various kinds of brake control operations, the solenoid valve device of the present invention has high airtightness, excellent water resistance and electrical resistance, and therefore is able to carry out good brake control.

Furthermore, in the present embodiment of the solenoid valve device according to the present invention, the resin-molded section of the bobbin assembly 3 is formed of two layers of resins having different properties, but may be formed of three or more layers of resins of different properties.

For example, there is formed the inner resin section for integrally setting at least the outer yoke and the solenoid coil. Then, the intermediate resin section which encloses the inner resin section and the outer resin section which encloses the intermediate resin section are formed.

Each of these resin sections, for example the inner resin section, is formed of a resin having a higher coefficient of thermal expansion than the outer and intermediate resin sections. The intermediate resin section is formed of a resin having a higher rate of elongation than the outer resin section. Furthermore, the outer resin section is formed of a resin having higher dimensional stability than the inner and intermediate resin sections.

Or the inner resin section is formed of a resin having a higher rate of elongation than the outer and intermediate resin sections, and the intermediate resin section is made of a resin having a higher dimensional stability than the inner resin section. Furthermore, the outer resin section is made of a resin having a higher dimensional stability than the inner and intermediate resin sections.

Furthermore, several layers of resin sections having different properties may be alternately laid one upon another in the plural number, to make the solenoid valve device having more stabilized airtightness and excellent dimensional stability and water resistance.

According to the present invention, it is possible to provide a solenoid valve device having high heat resistance, weather resistance and water resistance.

What is claimed is:

1. A solenoid valve device, comprising a bobbin assembly mounted within an outer cover, said bobbin assembly comprising a solenoid coil and an outer yoke forming a magnetic circuit with said coil, said coil and said yoke being integrally molded together with an inner resin section and defining a central hollow throughbore having opposed open ends, said bobbin assembly further comprising an outer resin section covering said inner resin section and having different physical properties from said inner resin section, said solenoid valve device further including at least one seal between said outer resin section and said outer cover, said seal being positioned around one of said open ends of said throughbore to form an air barrier, wherein transient dimensional variations of said coil or said yoke are substantially absorbed by said outer resin section leaving said outer resin section undeformed so as to maintain the integrity of said air barrier.

2. The solenoid valve device of claim 1, wherein said inner resin section is formed of a resin having a higher coefficient of thermal expansion than said outer resin section.

3. The solenoid valve device of claim 1, wherein said inner resin section is formed of at least one resin selected from among polyphenylene oxide, acrylonitrile-butadiene-styrene, polycarbonate, polyamide, polyacetal, polysulfone, and polyphenylene sulfide.

4. The solenoid valve device of claim 1, wherein said outer resin section is formed of a resin having a higher dimensional stability than said inner resin section.

5. A solenoid valve device as in claim 4, wherein said dimensional stability is the rate of thermal expansion accompanying changes in temperature or humidity.

6. The solenoid valve device of claim 1, wherein said outer resin section is made of at least one resin selected from among epoxy resin, unsaturated polyester, phenolic resin, polybutylene terephthalate resin, and modified polyphenylene ether.

7. The solenoid valve device of claim 1, further comprising an intermediate resin section enclosing said inner resin section and enclosed by said outer resin section, said intermediate resin section having different physical properties than either said inner or said outer resin sections.

8. The solenoid valve device of claim 7, wherein said inner resin section is formed of a resin having a higher coefficient of thermal expansion than said outer and said intermediate resin sections, said intermediate resin section is formed of a resin having a higher coefficient of thermal expansion than said outer resin section, and said outer resin section is formed of a resin having a higher dimensional stability than said inner and said intermediate resin sections.

9. The solenoid valve device of claim 7, wherein said inner resin section is formed of a resin having a higher coefficient of thermal expansion than said outer and said intermediate resin sections, said intermediate resin section is formed of a resin having higher dimensional stability than said inner resin section, and said outer resin section is formed of a resin having higher dimensional stability than said inner and said intermediate resin sections.

10. The solenoid valve device of claim 1, further comprising at least one electrical connector pin extending from the exterior of said outer cover into electrical contact with said coil, said pin being integrally molded with said coil and said yoke in said inner resin section and being capable of supplying electrical current to said coil.

11. The solenoid valve device of claim 1, wherein said device comprises a pair of bobbin assemblies integrally molded together with said inner resin section and covered by said outer resin section, said seal being positioned around a first pair of adjacent open ends of the throughbores of said bobbin assemblies to form an air barrier between said outer resin section and said outer cover.

12. The solenoid valve device of claim 11, wherein said first and said second seals comprise O-rings which are position within first and second grooves, respectively, formed in said outer resin section.

13. The solenoid valve device of claim 11, wherein said outer cover comprises a pair of blocks of split construction bolted together and said seal forms an air barrier between said outer resin section and an inner surface of one of said blocks, said solenoid valve device further including a second seal between said outer resin section and said other block, said second seal being positioned around a second pair of adjacent open ends of said throughbores opposite the first pair of open ends.

14. The solenoid valve device of claim 11, wherein one of said bobbin assemblies comprises a portion of a hold valve and said other of said bobbin assemblies comprises a portion of a decay valve, and wherein said hold valve and said decay valve constitute an integral part of an anti-lock brake control mechanism.

15. A brake control mechanism having a solenoid valve device comprising a bobbin assembly mounted within an outer cover, said bobbin assembly comprising;
a solenoid coil;
an outer yoke forming a magnetic circuit with said coil;
an inner resin section integrally molding said coil and said yoke together;
a central hollow throughbore within said coil having opposed open ends;
an outer resin section covering said inner resin section and being more dimensionally stable than said inner resin section, wherein expansion or contraction of said coil or said yoke is substantially absorbed by said outer resin section, and
said solenoid valve device further includes at least one seal between said outer resin section and said outer cover, said seal circumscribing one of said open ends of said throughbore to form an air barrier wherein expansion or contraction of said coil or said yoke has no effect on the integrity of said air barrier.

* * * * *